(12) United States Patent  
Chiang et al.

(10) Patent No.: US 8,469,574 B2
(45) Date of Patent: Jun. 25, 2013

(54) OPTICAL COMPONENT, BACKLIGHT MODULE AND DISPLAY APPARATUS USING SAME

(75) Inventors: Yi-Hsing Chiang, Tainan County (TW); Te-Hung Chang, Tainan County (TW)

(73) Assignee: Chi Lin Technology Co., Ltd., Jen Te Hsiang, Tainan County (TW)

( * ) Notice: Subject to any disclaimer, the term of this patent is extended or adjusted under 35 U.S.C. 154(b) by 365 days.

(21) Appl. No.: 12/837,363

(22) Filed: Jul. 15, 2010

(65) Prior Publication Data

US 2012/0014129 A1 Jan. 19, 2012

(51) Int. Cl.
*F21V 7/04* (2006.01)

(52) U.S. Cl.
USPC ............ 362/607; 362/317; 362/606; 362/608

(58) Field of Classification Search
USPC .... 362/253, 317, 326, 606, 607, 608; 349/58; 359/237

See application file for complete search history.

(56) References Cited

U.S. PATENT DOCUMENTS

| | | | |
|---|---|---|---|
| 5,598,281 | A | 1/1997 | Zimmerman et al. |
| 7,160,017 | B2 | 1/2007 | Lee et al. |
| 7,188,989 | B2 | 3/2007 | Miyashita |
| 2005/0185416 | A1 | 8/2005 | Lee et al. |
| 2006/0007302 | A1 | 1/2006 | Numata et al. |
| 2006/0139947 | A1 | 6/2006 | Mai et al. |
| 2007/0047260 | A1 | 3/2007 | Lee et al. |
| 2007/0176195 | A1 | 8/2007 | Kuiseko et al. |
| 2008/0089092 | A1 | 4/2008 | Lee et al. |

FOREIGN PATENT DOCUMENTS

| | | |
|---|---|---|
| TW | 200726996 A | 7/2007 |
| TW | 200846707 A | 12/2008 |
| TW | M354761 U | 4/2009 |

*Primary Examiner* — Stephen F Husar
*Assistant Examiner* — Meghan Dunwiddie
(74) *Attorney, Agent, or Firm* — Cheng-Ju Chiang

(57) ABSTRACT

An optical component is provided in the present disclosure. The optical component, which can be used in a backlight module or a display apparatus, comprises a substrate and optical medium poles embedded in the substrate. A refractive index difference between the substrate and the optical medium poles is greater than 0.4. A backlight module and a display apparatus are also provided.

16 Claims, 7 Drawing Sheets

OPTICAL COMPONENT, BACKLIGHT MODULE AND DISPLAY APPARATUS USING SAME

TECHNICAL FIELD

The present disclosure relates to an optical component, a backlight module and a display apparatus using the optical component.

BACKGROUND

Flat panel displays (FPDs) are widely used in various modern electronic product due to the advantages of low radiation and low power consumption. Some kinds of display panels, for example, liquid crystal panels, are passive optical devices, which are incapable of emitting light beams themselves. In order to enable these kinds of display panels to display images, in general, backlight modules are introduced in the FPDs as to provide sufficient illumination for the display panels.

Referring to FIG. 1, a typical FPD 100 comprises a display panel 101 and a backlight module 102. The backlight module 102 comprises a light source 110, a light guide plate (LGP) 120, an optical film assembly 130, and a reflector film 140. The LGP 120 comprises a bottom surface 121, a light emitting surface 122 opposite to the bottom surface 121, and a light incident surface 123 adjoining both the bottom surface 121 and the light emitting surface 122. The light source 110 is located adjacent to the light incident surface 123, and the reflector film 140 is located adjacent to the bottom surface 121. The optical film assembly 130 generally comprises an upper diffuser 131, a brightness enhance film (BEF) 132, and a lower diffuser 133 disposed between the light emitting surface 122 and the display panel 101 in that order from top to bottom.

The optical film assembly 130 is adapted to convert light beams emitting from the LGP 120 into uniform planar light. Typically, the BEF 132 employs micro-lens structures to gather the light beams, so as to enhance the brightness of the backlight module 102. The diffusers 131, 133 are used to scatter the light beams transmitted thereto, such that the planar light provided to the display panel 101 can be uniform.

As can be seen, in order to obtain the uniform planar light, it is needed to adopt various optical films in the backlight module 102, for example, the BEF 132 and the diffusers 131, 133. The variety of optical films may cause a structure of the backlight module 102 to be complicated, and additionally, a cost of such complicated backlight module 102 is high.

BRIEF DESCRIPTION OF THE DRAWINGS

The components in the drawing are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF EMBODIMENTS

Reference will now be made to the drawings to described exemplary embodiments in detail.

Figure 2:
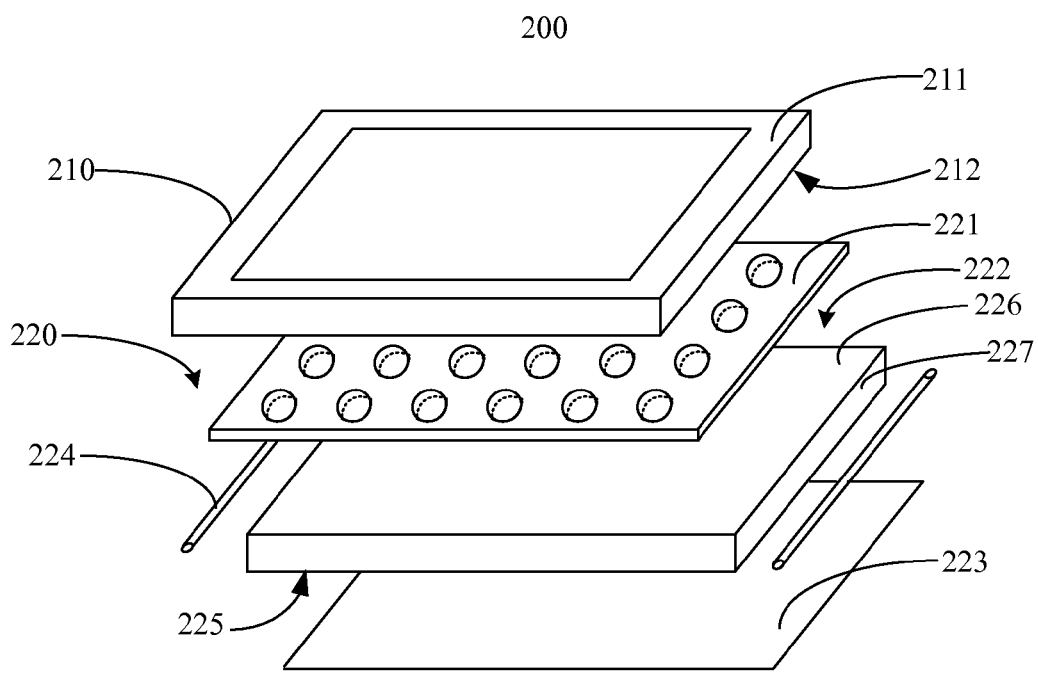
FIG. 2 is an exploded view of a display apparatus according to a first embodiment of the present disclosure, the display apparatus comprising a backlight module having an optical component.

FIG. 2 is an exploded view of a display apparatus 200, such as a flat panel display, according to a first embodiment of the present disclosure. The display apparatus 200 may comprises a display panel 210 and a backlight module 220. The display panel 210 may be a liquid crystal panel, which comprises a display surface 211 and a rear surface 212 opposite to the display surface 211. The backlight module 220 is positioned adjacent to the rear surface 212, and is configured to provide illumination for the display panel 210, so as to enable the display panel 210 to display images.

The backlight module 220 can be an edge-type backlight module, which may comprise an optical component 221, a light guide plate (LGP) 222, a reflector film 223, and at least one light source 224. Of cause, the backlight module 220 can also be another type backlight module, for example, direct-type backlight module.

The LGP 222 is adapted to guide light beams provided by the at least one light source 224 to emit toward the display panel 210. In particular, the LGP 222 may comprise a bottom surface 225, a light emitting surface 226 opposite to the bottom surface 225, and at least one light incident surface 227 adjoining both the bottom surface 225 and the light emitting surface 226. In the illustrated embodiment, for example, the LGP 222 comprises two opposite light incident surfaces 227, and a pair of cold cathode fluorescent lamps (CCFLs) or LED light bars are adopted in the backlight module 220, serving as the at least one light source 224. Each of the CCFL or LED light bar is disposed adjacent to a respective one of the light incident surfaces 227.

The reflector film 223 can be disposed adjacent the bottom surface 225, and is adapted to reflect light beams emitting out from the bottom surface 225 back to the LGP 222.

The optical component 221 can be disposed between the display panel 210 and the LGP 222. The optical component 221 is configured to convert light beams emitting from the LGP 222 into uniform planar light, and thereby providing brightness and uniformity of the display panel 210.

Figure 3:
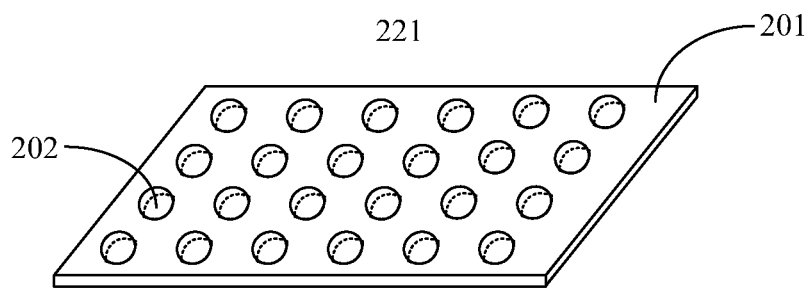
FIG. 3 is a perspective view of the optical component of FIG. 2.
Figure 4:
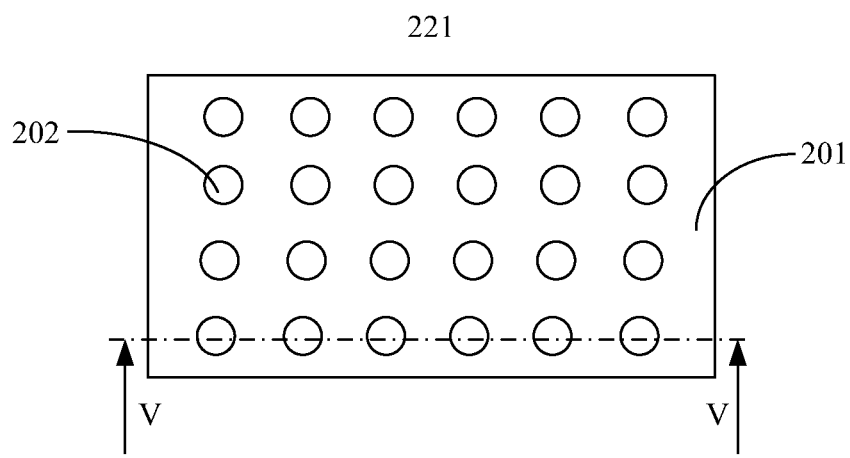
FIG. 4 is a planar view of the optical component of FIG. 2.
Figure 5:
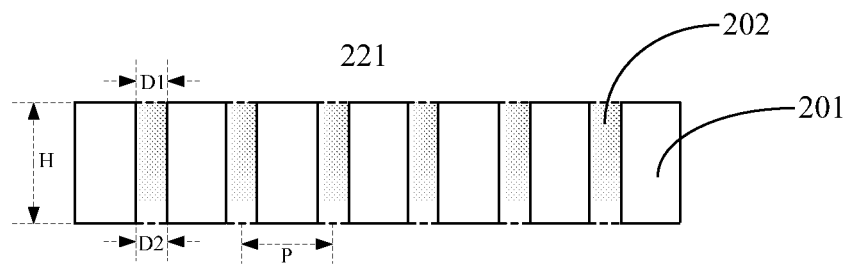
FIG. 5 is a cross-sectional view of the optical component taken from line V-V in FIG. 4.

Referring also to FIGS. 3-5, in the illustrated embodiment, the optical component 221 may have a single layer structure regarded as an optical layer, which comprises a transparent substrate 201 and a plurality of through holes 202. The substrate 201 comprises an upper surface and a lower surface, and the through holes 202 are formed in the substrate 201, extending from the upper surface to the lower surface of the substrate 201. In the illustrated embodiment, the plural through holes 202 can be distributed row by row and thereby forming a hole array. In an alternative embodiment (not shown), the plural through holes can also be randomly disposed in the substrate. It should be noted that the drawings only schematically shows a hole array with 4 row and 6 column formed in the substrate 201, in practical, a density of the through holes 202 may be much greater than that shown in the drawings.

In one embodiment, each of the through hole 202 may have a round shapes in both the upper and lower surfaces of the substrate 201, with diameters (comprising an upper diameter D1 and a lower diameter D2) approximately in a range from 10 μm (micrometer) to 1 mm (millimeter). In particular, a relation between the diameters D1 and D2 of the through holes 202 can be $0.9 \leq D1/D2 \leq 1.1$. For example, in the illustrated embodiment, D1=D2=D, where $10\,\mu m \leq D \leq 1\,mm$, and the diameter D is an average diameter of the through hole. Moreover, an aspect ratio H/D of the through holes 202 can be approximately in a range from 0.4 to 1.4, where H represents a depth of the through holes 202. As the through holes 202 extend from the upper surface to the lower surface of the substrate 201, H can also represents a thickness of the substrate 201. Further, a duty cycle D/P of the through holes 202 can be approximately in a range from 0.2 to 0.8, where P represents a distance between centers of two adjacent through holes 202. In addition, a relation for the diameters D1 and D2 of the through holes 202 can also be $0.8\,D \leq D1\,(or\,D2) \leq 1.2\,D$.

Optical medium can be filled in the through holes 202, such that a plurality of optical medium poles formed by the optical medium are embedded in the substrate 201. In addition, the optical medium poles are air poles forming a plurality of through holes 202 in the substrate 201. A refractive index N1 of the optical medium is different from a refractive index N2 of the substrate 201. For example, a refractive index difference ΔN between the substrate 201 and the optical medium poles can be greater than 0.4 (i.e., ΔN>0.4). Due to the refractive index difference ΔN, reflecting interfaces (i.e., inner surfaces of the through holes 202) are formed between the optical medium poles and the substrate 201. In operation, the reflecting interfaces are used to enable the light beams which have larger incident angles transmitted through the optical component 221 with much reflection, and incident into the display panel 210 with smaller incident angles.

Figure 6:
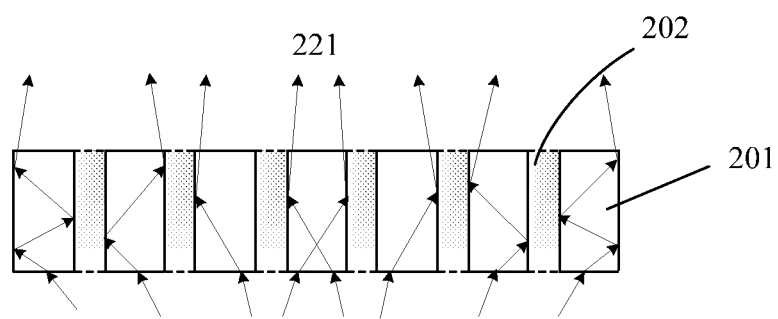
FIG. 6 schematically illustrates paths of light beams transmitted through the optical component of FIG. 2.

Referring to FIG. 6, paths of light beams transmitted through the optical component 221 are schematically illustrated. While emitting from the LGP (not shown), the light beams enter the optical component 221. Some light beams (not shown) having directions substantially perpendicular to the optical component 221 may be transmitted directly through the substrate 201 or the through holes 202. Besides, some light beams have larger incident angles may emit to the reflecting interfaces between the through holes 202 and the substrate 201. These light beams may be reflected among the reflecting interfaces for several times and then be guides to emit out from the optical component 221. Due to the reflection within the optical component 221, the transmissions of the reflected light beams are bounded, such that directions of most of the reflected light beams are confined to be substantially vertical to the display panel, and thereby forming substantially convergent planar light. Moreover, because the through holes 202 are distributed in the substrate 201, the above-described reflection within the optical component 221 can also make the reflected light beams to be uniformed. In other words, the optical component 221 with the through holes 202 may function as a diffuser and a prism sheet at the same time. And so, it is possible that use of the single-layer optical component 221 to replace an optical film assembly used in a conventional backlight module which consists of various optical films such as an upper diffuser, a BEF and a lower diffuser, and generates uniform planar light with better optical characteristics.

Figure 1:
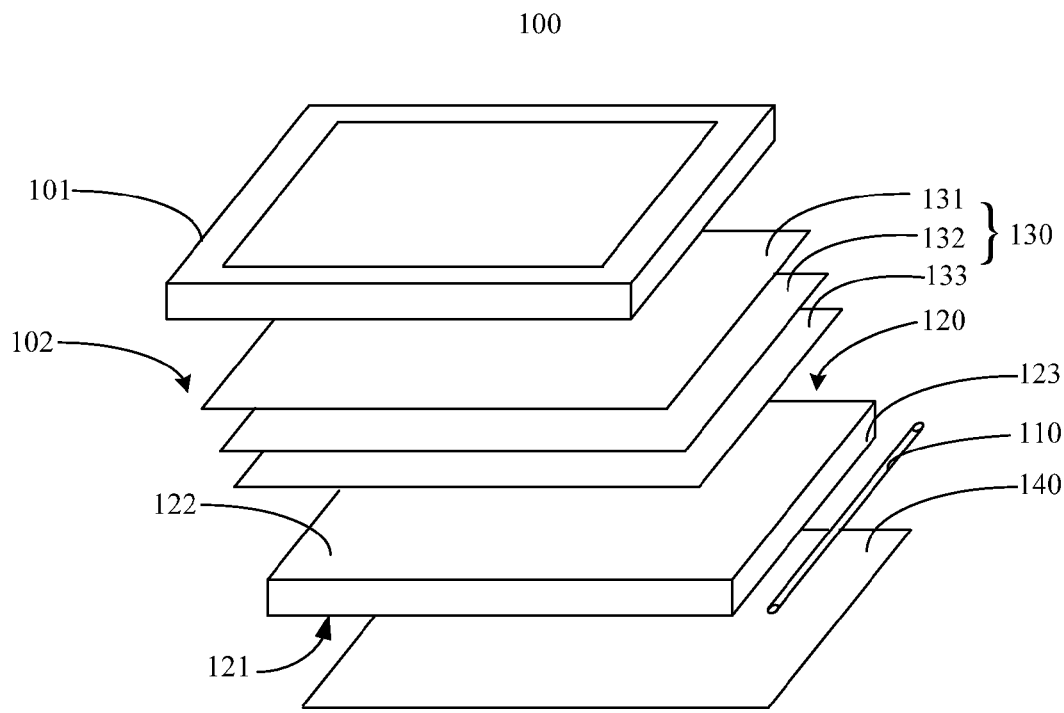
FIG. 1 is an exploded view of a conventional flat panel display.
Figure 7:
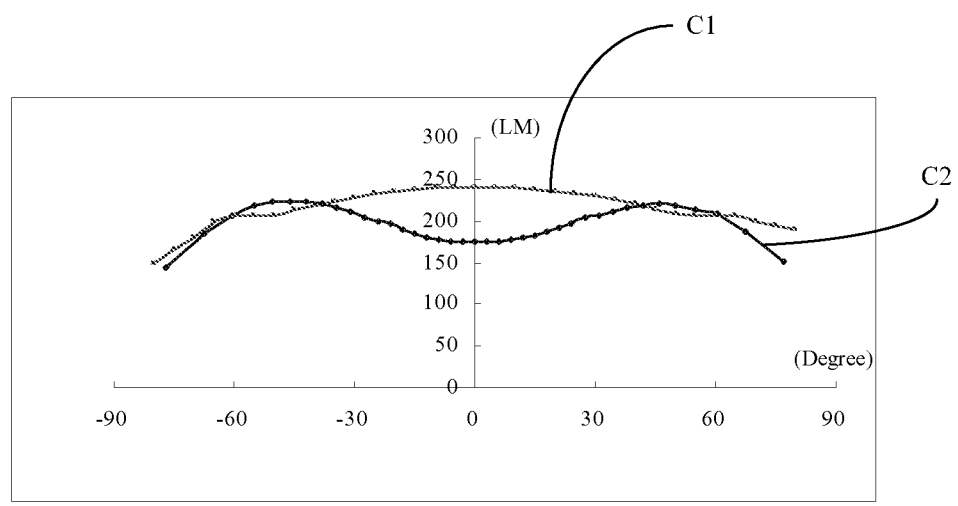
FIG. 7 schematically illustrates a relation between a viewing angle and a luminance of the backlight module of FIG. 2.

Referring to FIG. 7 and referring also to FIG. 2, curve C1 illustrates a relation between a viewing angle and a luminance of the backlight module 220 according to the present embodiment. To make the effect of the light reflection within optical component 221 more clearly, curve C2 illustrating a relation between a viewing angle and a luminance of a conventional edge-type backlight module (for example, that shown in FIG. 1), is also comparatively shown in FIG. 7. As shown in curve C2 of FIG. 7, the luminance of the conventional edge-type backlight module reach a maximum value when a viewing angle is about ±45° (degree), and the luminance is relatively low when the viewing angle is 0°. In contrast, according to the backlight module 220 provided in the illustrated embodiment, the luminance of the backlight module 220 reaches a maximum value upon the condition that the viewing angle is 0°, and the luminance decreases when the viewing angle increases, as shown in curve C1. That is, light intensity is relative greater when the viewing angle is small, for example, within −30° to 30°.

In fact, as described above, the optical component 221 is capable of guiding most of the reflected light beams to emit out from the backlight module 220 substantially vertically, which may result in greater luminance when the viewing angle is small, and lower luminance when the viewing angle is large. Thereby, it can be found that uniform planar light with a higher light intensity can be provided by the backlight module 220, so as to enable the display panel 210 to display image with an improved quality of uniformity.

Figure 8:
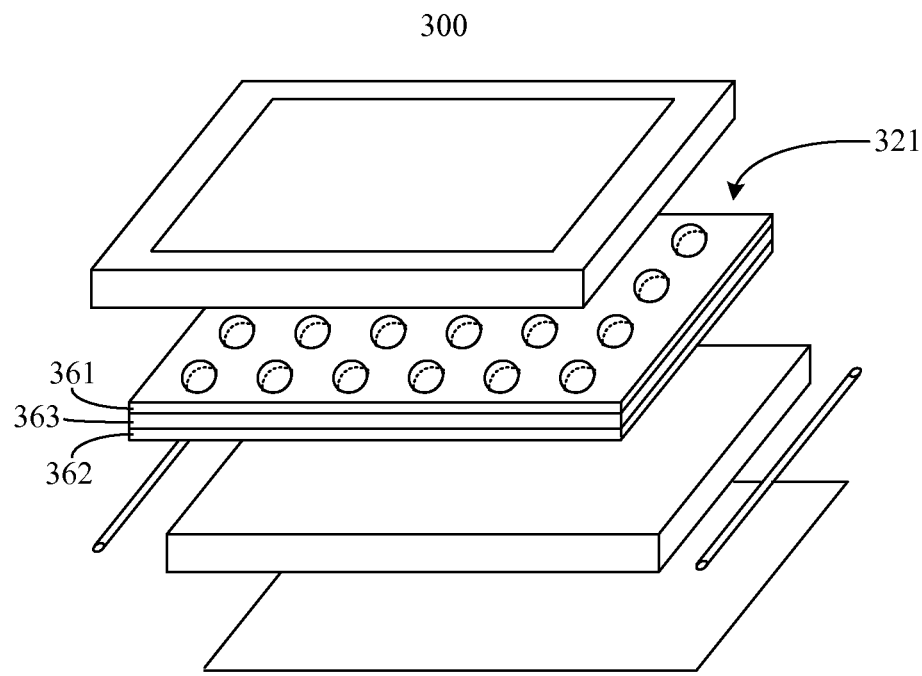
FIG. 8 is an exploded view of a display apparatus according to a second embodiment of the present disclosure, the display apparatus comprises an optical component.

FIG. 8 is an exploded view of a display apparatus 300, such as a flat panel display, according to a second embodiment of the present disclosure. The display apparatus 300 is similar to the above-described display apparatus 200 (as shown in FIG. 2), but differs in that a backlight module 320 of the display apparatus 300 comprises an optical component 321 having a multi-layer structure, which can be employed to replace the single-layer optical component 221 of the display apparatus 200.

Figure 9:
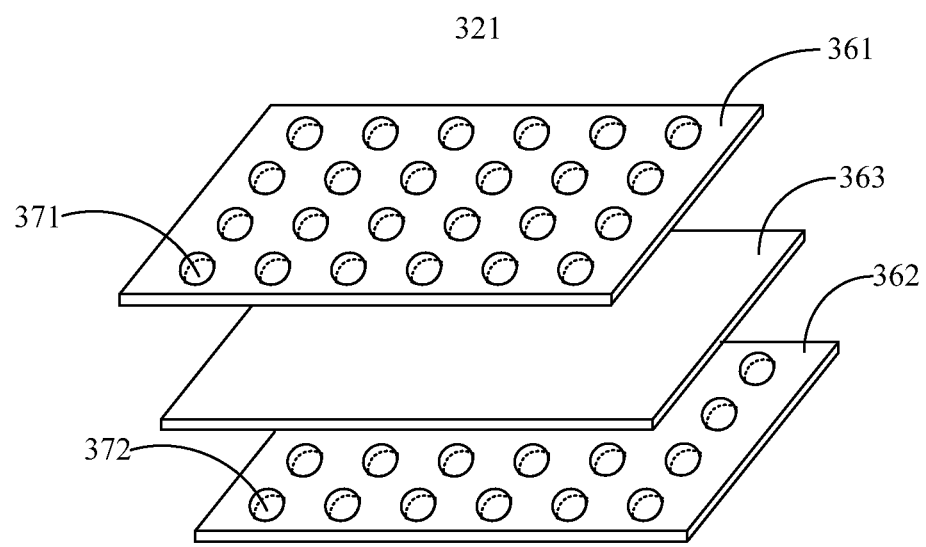
FIG. 9 is an exploded view of the optical component of FIG. 8.
Figure 10:
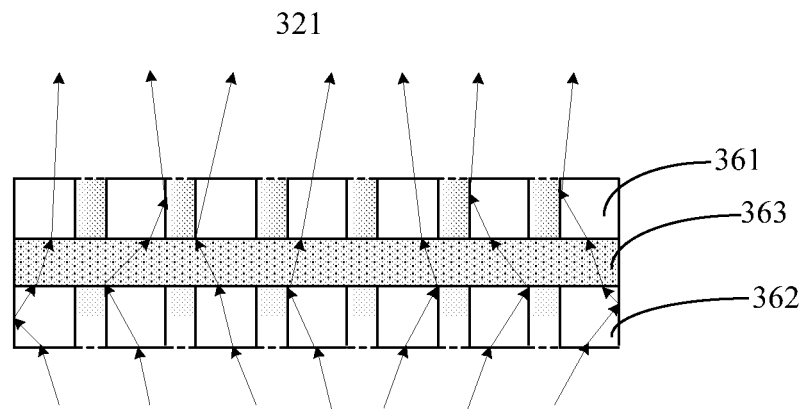
FIG. 10 is cross-sectional view of the optical component of FIG. 7, illustrating paths of light beams transmitted therethrough.

Referring also to FIGS. 9-10, an exploded view and a cross-sectional view of the optical component 321 are respectively illustrated. The optical component 321 comprises a first optical layer 361, a second optical layer 362, and a third optical layer 363.

In particular, each of the first optical layer 361 and the second optical layer 362 may have a structure and material similar to that of the optical component 221 of the display apparatus 200 (as shown in FIG. 2), while optionally having a smaller thickness. Moreover, the first optical layer 361 and the second optical layer 362 may respectively comprise a plurality of first through holes 371 and a plurality of second through holes 372. A distribution of the first through holes 371 in the first optical layer 361 can be substantially the same as that of the second through holes 372 in the second optical layer 362. That is, each of the first through holes 371 in the first optical layer 361 corresponds to a respective second through hole 372 in second optical layer 362, and the two corresponding through holes 371 and 372 are aligned with each other when the first and second optical layer 361 and 362 are assembled.

The third optical layer 363 are sandwiched between the first optical layer 361 and the second optical layer 362. The third optical layer 363 may have a plurality of micro-structures (not shown) such as micro-lens or beads disposed therein. The micro-structures are configured to enhance the brightness of the backlight module 320, such that an optical quality of the backlight module 320 can further be improved.

Figure 11:
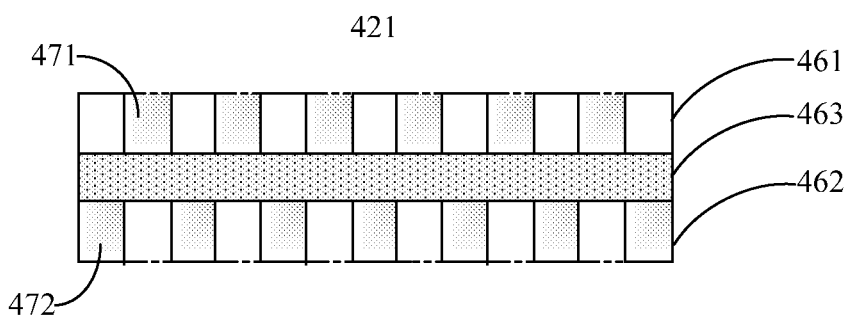
FIG. 11 is cross-sectional view of an optical component according to a third embodiment of the present disclosure.

FIG. 11 is cross-sectional view of an optical component according to a third embodiment of the present disclosure. The optical component 421 is similar to the above-described optical component 321 (as shown in FIG. 8), and comprises a first optical layer 461, a second optical layer 462 and a third optical layer 463. The first and second optical layers 461 and 462 respectively comprises a plurality of first through holes 471 and a plurality of second through holes 472, and the third optical layer 463 has a plurality of micro-structures. However, a distribution of the first through holes 471 in the first optical layer 461 is different from that of the second through holes 472 in the second optical layer 462. For example, the first through holes 471 in the first optical layer 461 are staggered with the second through holes 472 in the second optical layer 462, such that positions of the second through holes 472 in the second optical layer 462 corresponds to non-hole areas of the first optical layer 461.

Figure 12:
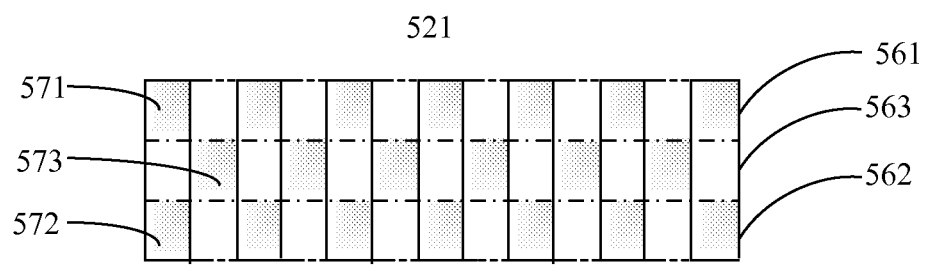
FIG. 12 is cross-sectional view of an optical component according to a fourth embodiment of the present disclosure.

FIG. 12 is cross-sectional view of an optical component according to a fourth embodiment of the present disclosure. The optical component 521 is similar to the above-described optical component 321 (as shown in FIG. 10), but differs in that a first optical layer 561, a second optical layer 562, and a third optical layer 563 of the optical component 521 respectively comprises a plurality of first through holes 571, second through holes 572, and third through holes 573. The through holes 571, 572, and 573 in each two adjacent optical layers 561/562 or 562/563 are staggered. In particular, a distribution of the first through holes 571 in the first optical layer 561 can be the same as that of the second through holes 572 in the second optical layer 562, while the third through holes 573 in the third optical layer 573 are disposed in position corresponding to non-hole areas of the other two optical layers 561 and 562. For example, the second through holes 572 in the second optical layer 562 may be staggered with the first through holes 571 in the first optical layer 561, as well as the third through holes 573 in the third optical layer 563.

Figure 13:
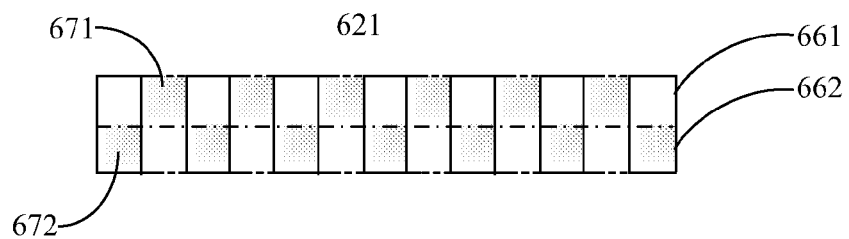
FIG. 13 is cross-sectional view of an optical component according to a fifth embodiment of the present disclosure.

FIG. 13 is cross-sectional view of an optical component according to a fifth embodiment of the present disclosure. The optical component 621 is similar to the above-described optical component 521 (as shown in FIG. 12), but differs in that the optical component 621 has a dual-layer structure, which comprises a first optical layer 661 and a second optical layer 662. The first optical layer 661 and the second optical layer 662 respectively comprises a plurality of first through holes 671 and a plurality of second through holes 672. The first through holes 671 in the first optical layer 661 are staggered with the second through holes 672 in the second optical layer 662.

As alternative embodiments of the optical components (as shown in FIG. 8-13) of the second to fifth embodiment described above, the optical layers of each type of the optical components can be in integrated into one piece. Take an alternative embodiment of the optical component of the second embodiment as an example, the first optical layer of each type optical component can also be integrated into the second optical layer or the third optical layer, or both of the second optical layer and the third optical layer integrated as one piece. Specifically, the optical component having the above-mentioned micro-structures may be provided. In the optical component a plurality of first blind holes are disposed at an upper surface of the optical component, and the first blind holes extend downwards to a first predetermined depth, for example, about ⅓ (or ½) thickness of the optical component. A plurality of second blind holes are also disposed at a lower surface of the optical component, and the second blind holes extend upwards to a second predetermined depth, for example, about ⅓ (or ½) thickness of the thickness of the optical component. Moreover, optical medium can be filled in both the upper and second blind holes. With this configuration, the optical component can be divided into a first optical layer with the first blind holes, a second optical layer with the second blind holes, and a third optical layer without holes, or the optical component can also be divided into an first optical layer with the first blind holes and a second optical layer with the second blind holes. Moreover, the first, second and/or third layers may all have micro-structures formed therein to obtain best optical effect.

Figure 14:
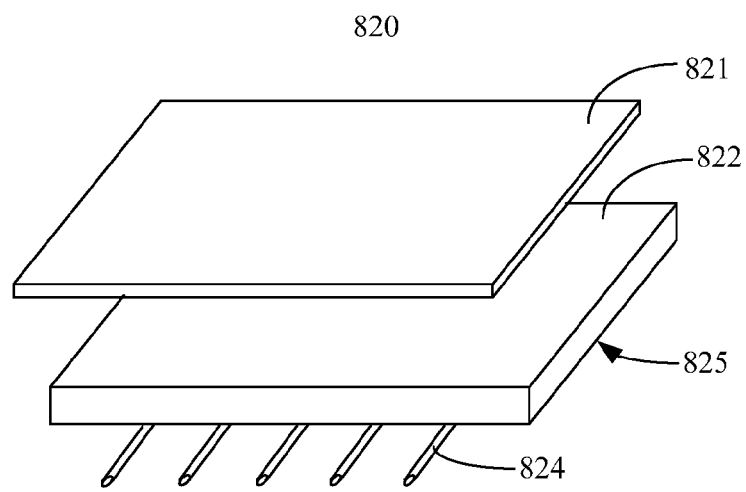
FIG. 14 is an exploded view of a backlight module according to the present disclosure, the backlight module comprises one of the optical sheets and optical component described above.

FIG. 14 is an exploded view of a backlight module using one of the optical sheets or the optical component of the present disclosure. The backlight module 820 is similar to that of the above-described backlight module 220 (as shown in FIG. 2), and comprises an optical component 821, an LGP 822, and a plurality of light sources 824. As an example, the backlight module 820 shows a direct-type backlight module. A bottom surface 825 of the LGP 822 is configured as a light incident surface, and the light sources 824 are disposed adjacent to the bottom surface 825. The light sources 824 can be CCFLs or LED light bars, or can be LED arrays etc.

Figure 15:
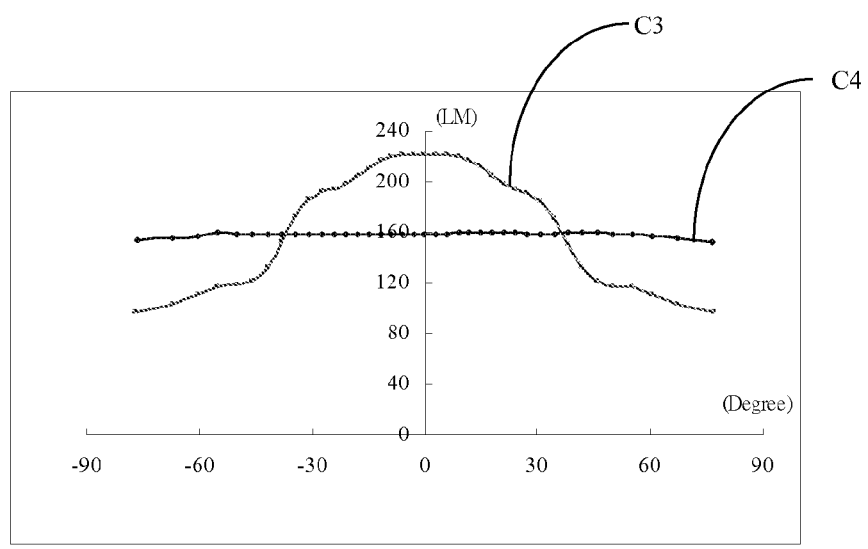
FIG. 15 schematically illustrates a relation between a viewing angle and a luminance of the backlight module of FIG. 14.

Referring also to FIG. 15 and referring also to FIG. 8, when the backlight module 820 makes use of the optical component 221 (as shown in FIG. 3) as the optical component 821, a relation between a viewing angle and a luminance of the backlight module 820 is shown. From a curve C3 as shown in FIG. 15, it can be seen that the luminance of the backlight module 820 is greater while the viewing angle is within −30° to 30°, and the luminance decreases when the viewing angle increases. Compared with a conventional direct-type backlight module as shown by a curve C4, by use of the optical component 821, the backlight module 820 is capable of converging the light beams to emit out in a relative small angle range, such that optical characteristics (e.g., light intensity) of the backlight module 820 is improved.

Figure 16:
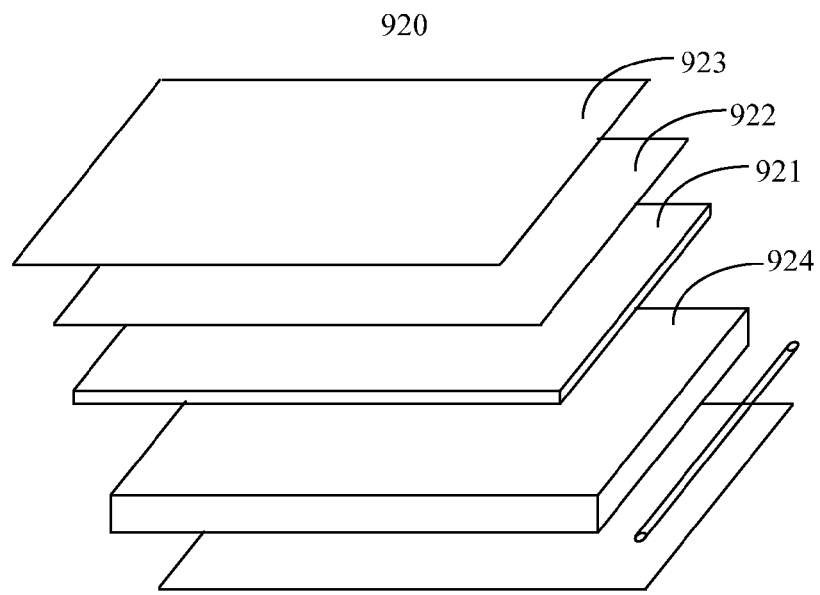
FIG. 16 is exploded view of a backlight module according to a sixth embodiment of the present disclosure.

Furthermore, in practical, some other optional optical films such as diffuser and/or BEF can also be used in the backlight module or display apparatus (such as flat panel display) of the present disclosure, in order that the optical characteristics of the backlight module or display apparatus can be further improved. Referring to FIG. 16, a backlight module 920 can be either an edge-type or a direct-type backlight module, which comprises an optical component 921, a prism sheet 922 (or a BEF), a diffuser 923, and an LGP 924. The optical component 921 can be any one of the optical sheets or the optical film assemblies as described in the above embodiments. The optical component 921, the prism sheet 922 (or the BEF) and the diffuser 923 are disposed on the LGP 924 in that order from bottom to top. By use of the prism sheet 922 (or the BEF) and diffuser 923, optical characteristics such as light intensity and uniformity of the backlight module 920 can be further improved. Furthermore, the diffuser 923 may be replaced by the optical component 921 too.

Figure 17:
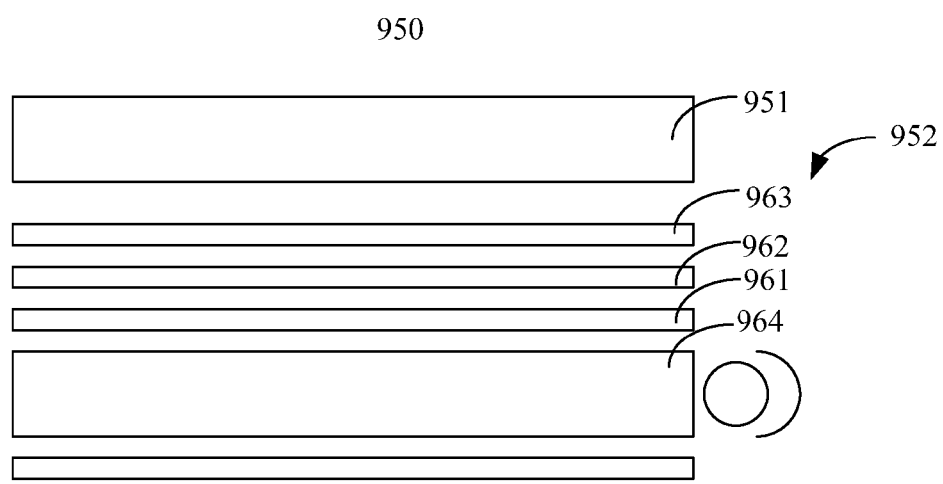
FIG. 17 is side view of a display apparatus according to a seventh embodiment of the present disclosure.

Referring to FIG. 17, a display apparatus 950 comprises a display panel 951 and a backlight module 952. The backlight module 952 comprises an optical component 961, a prism sheet 962 (or a BEF), a diffuser 963, and an LGP 964. The optical component 961 can be any one of the optical sheets or the optical film assemblies as described in the above embodiments. The optical component 961, the prism sheet 962 (or the BEF) and the diffuser 963 are disposed between the LGP 964 and the display panel 951 in that order from bottom to top. Furthermore, the diffuser 963 may be replaced by the optical component 961 too.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broad general meaning of the terms in which the appended claims are expressed.

What is claimed is:

1. An optical component adapted for using in a backlight module providing light sources to a display apparatus, the optical component comprising:
    a first optical layer comprising:
    a substrate; and
    optical medium poles embedded in the substrate;
    wherein a refractive index difference between the substrate and the optical medium poles is greater than 0.4;
    the optical medium poles are air poles forming a plurality of through holes in the substrate; and
    a diameter D of the through hole is approximately in a range from 10 μm to 1 mm.

2. The optical component of claim 1, wherein an aspect ratio H/D of the through hole is approximately in a range from 0.4 to 1.4, and H represents a depth of the through hole.

3. The optical component of claim 1, wherein a duty cycle D/P of the through hole is approximately in a range from 0.2 to 0.8, and P represents a distance between centers of two adjacent through holes.

4. The optical component of claim 1, wherein each of the through holes comprises an upper diameter D1 corresponding to the upper surface, and a lower diameter D2 corresponding to the lower surface, and D1/D2 is approximately in a range from 0.9 to 1.1.

5. The optical component of claim 1, further comprising a second optical layer and a third optical layer sandwiched between the first optical layer and the second optical layer, and the optical medium poles are at least disposed in the first optical layer and the second optical layer.

6. The optical component of claim 5, wherein micro-structures are formed in the third optical layer.

7. A backlight module, comprising:
    a light guide plate comprising at least one light incident surface and a light emitting surface;
    at least one light source adjacent to the at least one light incident surface of the light guide plate; and
    an optical component adjacent to a light emitting surface of the light guide plate, the optical component comprising a first optical layer comprising a substrate and optical medium poles embedded in the substrate, and a refractive index difference between the substrate and the optical medium poles being greater than 0.4;
    wherein the optical medium poles are air poles forming a plurality of through holes in the substrate; and
    a diameter D of the through hole is approximately in a range from 10 μm to 1 mm.

8. The backlight module of claim 7, wherein an aspect ratio H/D of the through hole is approximately in a range from 0.4 to 1.4, and H represents a depth of the through hole.

9. The backlight module of claim 7, wherein a duty cycle D/P of the through hole is approximately in a range from 0.2 to 0.8, and P represents a distance between centers of two adjacent through holes.

10. The backlight module of claim 7, wherein each of the through holes comprises an upper diameter D1 corresponding to the upper surface, and a lower diameter D2 corresponding to the lower surface, and D1/D2 is approximately in a range from 0.9 to 1.1.

11. The backlight module of claim 7, further comprising a second optical layer and a third optical layer sandwiched between the first optical layer and the second optical layer.

12. The backlight module of claim 11, wherein micro-structures are formed in the third optical layer.

13. The backlight module of claim 7, further comprising one or more films of the following: a diffuser, a brightness enhance film or a prism sheet disposed on the optical component.

14. A display apparatus, comprising:
    a display panel configured to display images; and
    a backlight module configured to provide illumination for the display panel, the backlight module comprising:
    a light guide plate; and
    an optical component disposed between the display panel and the light guide plate, the optical component comprising a first optical layer comprising a substrate and optical medium poles embedded in the substrate, and a refractive index difference between the substrate and the optical medium poles being greater than 0.4;
    wherein the optical medium poles are air poles forming a plurality of through holes in the substrate, and a diameter D of the through hole is approximately in a range from 10 μm to 1 mm.

15. The display apparatus of claim 14, wherein an aspect ratio H/D of the through hole is approximately in a range from 0.4 to 1.4, and H represents a depth of the through hole.

16. The display apparatus of claim 14, further comprising one or more films of the following: a diffuser, a brightness enhance film or a prism sheet disposed on the optical component.

* * * * *